April 6, 1926.

H. R. GROESBECK

AUTOMOBILE BUMPER

Filed Nov. 9, 1925

1,579,928

2 Sheets-Sheet 1

WITNESSES:

INVENTOR:
Hoadley R. Groesbeck,
BY
ATTORNEY

April 6, 1926.  1,579,928

H. R. GROESBECK

AUTOMOBILE BUMPER

Filed Nov. 9, 1925  2 Sheets-Sheet 2

WITNESSES:
Alfred E. Ochinger
George A. Gruss

INVENTOR:
Hoadley R. Groesbeck
BY
Joshua R. H. Potts
ATTORNEY.

Patented Apr. 6, 1926.

1,579,928

UNITED STATES PATENT OFFICE.

HOADLEY R. GROESBECK, OF PHILADELPHIA, PENNSYLVANIA.

AUTOMOBILE BUMPER.

Application filed November 9, 1925. Serial No. 67,812.

*To all whom it may concern:*

Be it known that I, HOADLEY R. GROESBECK, a citizen of the United States, residing at Philadelphia, in the county of Philadelphia and State of Pennsylvania, have invented certain new and useful Improvements in Automobile Bumpers, of which the following is a specification.

My invention relates to automobile bumpers and more particularly to the bumper supporting means.

When backing an automobile into a small parking space, especially in front of a parked vehicle, it is difficult, even for an expert driver, to ascertain the distance between the automobile and the parked vehicle. It frequently happens that the driver backs the automobile until it strikes the parked vehicle and usually results in marred, bent or broken parts on the parked vehicle or the backing automobile.

The objects of my invention are to provide bumper supporting means which will yield and signal to the driver when the bumper strikes a parked vehicle or other object at the rear of the automobile, which will retain the full heavy shock absorbing capacity of the bumper, and which will be free of objectionable vibratory noises.

These objects, and other advantageous ends which will be described hereinafter, I attain in the following manner, reference being had to the accompanying drawings in which—

Figure 1:
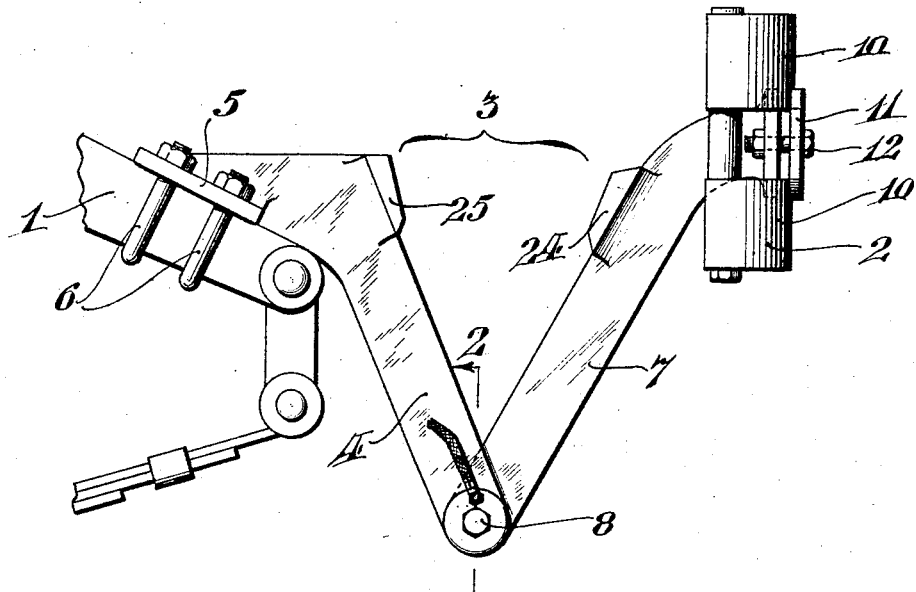
Figure 3:
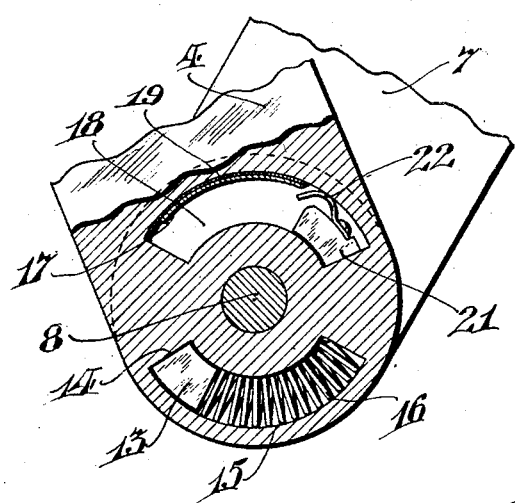
Figure 2:
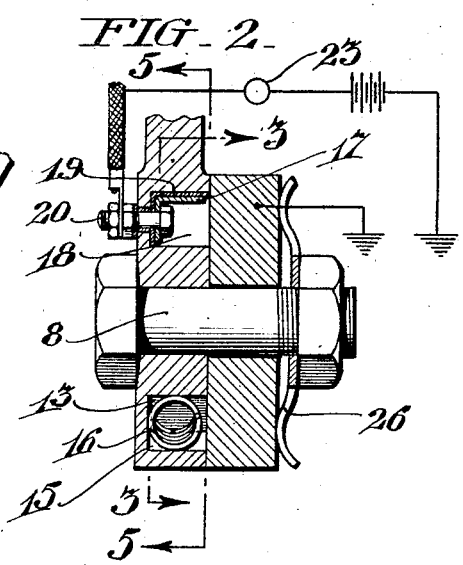
Figure 4:
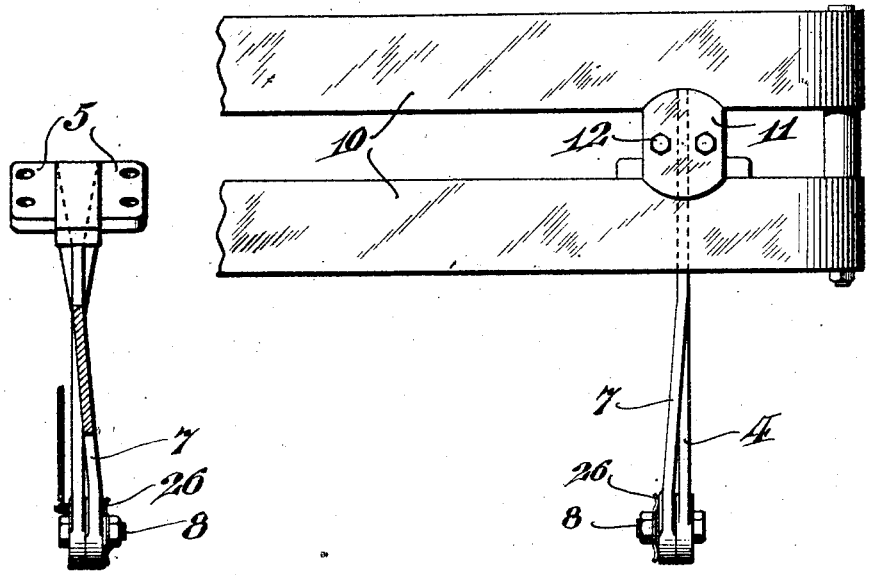
Figure 5:
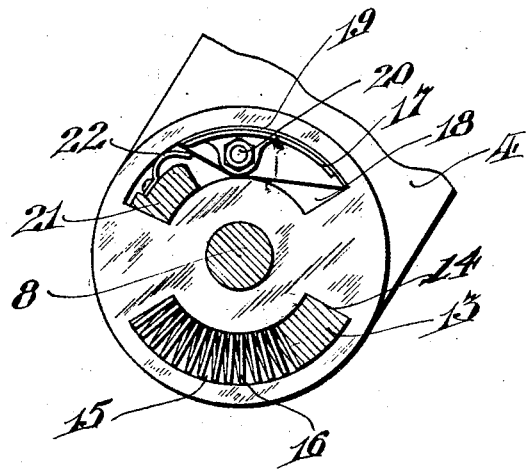

Figure 1 is a side elevation of a chassis end and a bumper connected in accordance with my invention, Figure 2 a section on line 2—2 of Figure 1, Figure 3 a section on line 3—3 of Figure 2, Figure 4 a front view of the bumper and its associated parts shown in Figure 1, some of the parts being omitted and broken away, and Figure 5 a section on line 5—5 of Figure 2.

Referring to the drawings, 1 indicates the chassis of an automobile, 2 a bumper and 3 my improved bumper supporting means secured to the rear end of the chassis and rigidly connected with the bumper. The bumper supporting means consists of two similar sets of pivoted members, one set being attached at each side of the chassis and a description of one set will suffice for both. An extension 4 has at the upper end a pair of flanges 5 through which the ends of U-bolts 6 pass when embracing the chassis to secure the extension thereto. An arm 7 is pivoted at its lower end to the lower end of extension 4 by a bolt 8, and has its upper end rigidly secured to bumper 2, preferably by clamping spring strips 10 of the bumper against the upper end of arm 7 with a clamping plate 11 tightened by bolts 12. Arm 7 is held against swinging outwardly by a lug 13 projecting from the arm and abutting the end 14 of an arcuate groove 15 in the lower end of extension 4. A coiled spring 16, normally under tension, keeps lug 13 in abutment with the end 14 of the groove and thus prevents vibration of the lug.

When bumper 2 strikes a vehicle or other object in the rear of the automobile and swings arm 7, a signal is given to the driver through the medium of electrical means preferably connected adjacent pivot bolt 8. Such means include a switch in the form of an arcuate contact 17 mounted in an arcuate groove 18 in extension 4 and insulated therefrom by an insulating member 19. Contact 17 and insulating member 19 are secured in groove 18 by a terminal bolt 20. A lug 21 projecting into groove 18 from arm 7, carries a brush 22 which is adapted to engage contact 17 when the arm is swung out of normal position. Contact 17 is electrically connected through terminal bolt 20 to one end of a signal device 23 such as a bulb, the other end of which is connected with a battery grounded to the vehicle. Brush 22 is grounded to the vehicle and thus makes an electrical connection with the other end of signal bulb 23.

When bumper 2 receives a heavy shock, arm 7 will be swung inwardly until a stop 24 on the arm abuts a stop 25 on the extension. The full shock absorbing capacity of the bumper is then brought into action to absorb the shock without harming the electrical and resilient parts around pivot bolt 8.

Should the bumper strike an object or vehicle at one end only so as to cause the bumper to move inwardly only at that end, I provide means, for preventing binding between arm 7 and extension 4, in the form of a spring washer 26 clamped against the arm by the nut of bolt 8. The washer normally keeps the end of the arm against the end of the extension and allows a slight twisting thereof when one end of the bumper swings inwardly. The bore in the arm makes a loose fit with bolt 8 to allow such slight twisting movement of the arm.

When the automobile is backing into a small parking space in front of a parked vehicle and the bumper strikes the vehicle, the bumper will swing inwardly on the two sets of pivoted members. The resistance offered by the bumper due to the two coiled springs 16, one in each set of pivoted members, is insufficient to injure any part of the vehicle. As the bumper is swung inwardly, brushes 22 are brought into engagement with contacts 17 to complete a circuit through and illuminate signal bulb 23 which gives the driver a signal that the bumper has struck the vehicle. The driver will then run the automobile forward. As the automobile is moving forward, coiled springs 16 will swing the bumper to its outward position until lugs 13 abut the end 14 of the grooves. When the automobile is running, vibration of the arms relatively to the extensions is prevented by the coiled springs 16 and the spring washers 26.

It will be seen that vehicles equipped with the bumper supporting means above described, are less likely to injure parked vehicles when backing, and the full shock-absorbing capacity of the bumper is retained.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the chassis of a vehicle and a bumper; extensions rigidly secured to the chassis; arms pivoted on the extensions for swinging in vertical planes; a bumper rigidly secured to the arms, and means adapted to co-act with said extensions and arms to give a signal when said arms are swung out of normal position.

2. In combination with the chassis of a vehicle and a bumper; extensions rigidly secured to the chassis; arms pivoted on the extensions for swinging in vertical planes; a bumper rigidly secured to the arms; means adapted to co-act with the arms to give a signal when said arms are swung out of normal position; stops on the extensions, and stops on the arms adapted to abut the stops on the extensions to limit the swinging movement of the arms.

3. In combination with the chassis of a vehicle and a bumper; a plurality of sets of pivoted members secured to the chassis and the bumper whereby the members secured to the bumper will swing in vertical planes; an electrical contact on one of said members; means on the other member adapted to engage the contact when the bumper is swung out of normal position, and resilient means for keeping the bumper in normal position.

4. In combination with the chassis of a vehicle and a bumper; a plurality of sets of pivoted members secured to the chassis and the bumper whereby the bumper will swing toward the chassis, one of said members having an arcuate groove; an arcuate contact mounted in the groove and insulated from said member; a lug on the other member projecting in the groove; means on the lug adapted to engage the contact when the bumper is swung out of normal position, and resilient means for keeping the bumper in normal position.

5. In combination with the chassis of a vehicle and a bumper; a plurality of sets of pivoted members secured to the chassis and the bumper whereby the bumper will swing toward the chassis, one of said members having a pair of arcuate grooves; an electrical contact mounted in one of the grooves and insulated from said member; means on the other member adapted to engage the contact to make an electrical connection when the bumper is swung out of normal position; a spring in the other groove, and a lug projecting from the other member into the groove and adapted to compress the spring when the bumper is swung out of normal position.

6. In combination with the chassis of a vehicle and a bumper; depending extensions rigidly secured to the chassis and having arcuate grooves in their ends; arms pivoted to the ends of the extensions; lugs on the arms projecting into the grooves; an electrical contact in one of the grooves; means on the lug projecting in said groove for making electrical connection with the contact when the bumper is swung out of normal position, and a spring in the other groove abutting the lug projecting therein for keeping the bumper in normal position.

In testimony whereof I have signed my name to this specification.

HOADLEY R. GROESBECK.